US012293068B2

(12) United States Patent
Ebrahimi Afrouzi et al.

(10) Patent No.: US 12,293,068 B2
(45) Date of Patent: *May 6, 2025

(54) ROBOTIC FLOOR-CLEANING SYSTEM MANAGER

(71) Applicants: Ali Ebrahimi Afrouzi, Henderson, NV (US); Soroush Mehrnia, Helsingborg (SE)

(72) Inventors: Ali Ebrahimi Afrouzi, Henderson, NV (US); Soroush Mehrnia, Helsingborg (SE)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,134

(22) Filed: Aug. 29, 2023

(65) Prior Publication Data
US 2023/0409181 A1    Dec. 21, 2023

Related U.S. Application Data

(63) Continuation of application No. 15/949,708, filed on Apr. 10, 2018, now Pat. No. 12,093,520, which is a
(Continued)

(51) Int. Cl.
| | |
|---|---|
| *G05D 1/648* | (2024.01) |
| *B25J 9/16* | (2006.01) |
| *B25J 11/00* | (2006.01) |
| *B25J 13/00* | (2006.01) |
| *G05D 1/00* | (2006.01) |

(Continued)

(52) U.S. Cl.
CPC ........ *G06F 3/04847* (2013.01); *B25J 9/1666* (2013.01); *B25J 11/0085* (2013.01); *B25J 13/00* (2013.01); *B25J 13/006* (2013.01); *G05D 1/0219* (2013.01); *G05D 1/2295* (2024.01); *G05D 1/246* (2024.01); *G05D 1/6482* (2024.01);
(Continued)

(58) Field of Classification Search
None
See application file for complete search history.

(56) References Cited

U.S. PATENT DOCUMENTS

| | | | |
|---|---|---|---|
| 5,942,869 | A | 8/1999 | Katou |
| 5,995,884 | A | 11/1999 | Allan |

(Continued)

FOREIGN PATENT DOCUMENTS

DE    102017104691 A1    9/2018

OTHER PUBLICATIONS

Ackerman, Evan, IEEE Spectrum, This robot mops and vacuums your floors at the same time, (Year: 2013).

*Primary Examiner* — Ryan Rink

(57) ABSTRACT

Some aspects provide a method for instructing operation of a robotic floor-cleaning device based on the position of the robotic floor-cleaning device within a two-dimensional map of the workspace. A two-dimensional map of a workspace is generated using inputs from sensors positioned on a robotic floor-cleaning device to represent the multi-dimensional workspace of the robotic floor-cleaning device. The two-dimensional map is provided to a user on a user interface. A user may adjust the boundaries of the two-dimensional map through the user interface and select settings for map areas to control device operation in various areas of the workspace.

30 Claims, 5 Drawing Sheets

Related U.S. Application Data continuation of application No. 15/272,752, filed on Sep. 22, 2016, now Pat. No. 10,496,262.

(60) Provisional application No. 62/272,004, filed on Dec. 28, 2015, provisional application No. 62/235,408, filed on Sep. 30, 2015.

(51) Int. Cl.
    *G05D 1/229*      (2024.01)
    *G05D 1/246*      (2024.01)
    *G06F 3/04847*      (2022.01)
    *G05D 1/223*      (2024.01)
    *G05D 105/10*      (2024.01)

(52) U.S. Cl.
    CPC ....... *G05D 1/2232* (2024.01); *G05D 2105/10* (2024.01); *Y10S 901/01* (2013.01)

(56) References Cited

U.S. PATENT DOCUMENTS

| | | |
|---|---|---|
| 6,535,793 B2 | 3/2003 | Allard |
| 6,667,592 B2 | 12/2003 | Jacobs |
| 7,024,278 B2 | 4/2006 | Chiappetta |
| 7,054,476 B2 | 5/2006 | Oosawa |
| 7,769,492 B2 | 8/2010 | Wang |
| 7,813,835 B2 | 10/2010 | Fujita |
| 8,355,828 B2 | 1/2013 | Tolia |
| 8,364,309 B1 | 1/2013 | Bailey |
| 8,438,695 B2 | 5/2013 | Gilbert, Jr. |
| 8,528,157 B2 | 9/2013 | Schnittman |
| 8,798,834 B2 | 8/2014 | Jeong |
| 8,903,590 B2 | 12/2014 | Jeon |
| 9,008,835 B2 | 4/2015 | Dubrovsky |
| 9,283,674 B2 | 3/2016 | Hoffman |
| 9,298,183 B2 | 3/2016 | Artes |
| 2003/0030399 A1 | 2/2003 | Jacobs |
| 2003/0184436 A1 | 10/2003 | Seales |
| 2005/0171636 A1* | 8/2005 | Tani .................... G05D 1/0276 701/23 |
| 2006/0020369 A1 | 1/2006 | Taylor |
| 2008/0311878 A1 | 12/2008 | Martin |
| 2009/0082879 A1 | 4/2009 | Dooley |
| 2009/0303042 A1 | 12/2009 | Song |
| 2009/0306822 A1 | 12/2009 | Augenbraun |
| 2010/0082193 A1 | 4/2010 | Chiapepetta |
| 2011/0264305 A1 | 10/2011 | Choe |
| 2011/0267280 A1 | 11/2011 | De Mers |
| 2012/0229660 A1 | 9/2012 | Matthews |
| 2013/0056032 A1 | 3/2013 | Choe |
| 2013/0060379 A1 | 3/2013 | Choe |
| 2013/0206177 A1 | 8/2013 | Burlutskiy |
| 2014/0100736 A1 | 4/2014 | Kim |
| 2014/0147240 A1 | 5/2014 | Noda |
| 2014/0207280 A1 | 7/2014 | Duffley |
| 2014/0303775 A1 | 10/2014 | Oh |
| 2014/0320661 A1 | 10/2014 | Sankar |
| 2015/0241984 A1 | 8/2015 | Itzhaik |
| 2016/0193729 A1 | 7/2016 | Williams |
| 2016/0282862 A1 | 9/2016 | Duffley |
| 2016/0297072 A1 | 10/2016 | Williams |
| 2017/0123421 A1 | 5/2017 | Kentley |
| 2017/0273527 A1 | 9/2017 | Han |
| 2017/0283092 A1 | 10/2017 | Brown |
| 2018/0200888 A1 | 7/2018 | Kim |
| 2019/0061157 A1 | 2/2019 | Suvarna |
| 2020/0027336 A1 | 1/2020 | Cho |
| 2021/0138657 A1 | 5/2021 | Cui |

\* cited by examiner

ROBOTIC FLOOR-CLEANING SYSTEM MANAGER

CROSS-REFERENCE TO RELATED APPLICATIONS

This application is a Continuation of U.S. Non-Provisional application Ser. No. 15/949,708, filed Apr. 10, 2018, which is a Continuation of U.S. Non-Provisional application Ser. No. 15/272,752, filed Sep. 22, 2016, which claims the benefit of U.S. Provisional Patent Application Nos. 62/235,408, filed Sep. 30, 2015, and 62/272,004, filed Dec. 28, 2015, each of which is hereby incorporated by reference.

FIELD OF THE DISCLOSURE

Some embodiments of the disclosure relate to a method and computer program product for graphical user interface (GUI) organization control for robotic floor-cleaning devices.

BACKGROUND

Robotic floor-cleaning devices are an increasingly popular solution for keeping floors clean in residential and commercial settings. Many robotic floor-cleaning systems generate maps of their environments using sensors to better navigate through the environment. However, such maps often contain errors and may not accurately represent the areas that a user may want the robotic floor-cleaning device to service. Further, users may want to customize operation of a robotic floor-cleaning device based on location within a map. For example, a user might want a robotic floor-cleaning device to service a first room with a steam cleaning function but service a second room without the steam cleaning function. A need exists for a method for users to adjust a robotic floor-cleaning map and control operations of a robotic floor-cleaning device based on location within the map.

SUMMARY

Some aspects provide a method and computer program product for graphical user interface (GUI) organization control of robotic floor-cleaning devices.

In some embodiments, a map of a workspace is generated from data acquired by sensors positioned on a robotic floor-cleaning device. In some embodiments, the map is sent to a user interface on a device such as a smartphone, computer, tablet, dedicated remote control, or any device that may display outputs from the system and receive inputs from a user. Through the user interface, a user may make changes to the map boundaries and select settings for the robotic floor-cleaning device to carry out in user-identified areas of the workspace. In some embodiments, user adjustments are sent from the user interface to the robotic floor-cleaning device to implement the changes.

DETAILED DESCRIPTION OF SOME EMBODIMENTS

Figure 1:
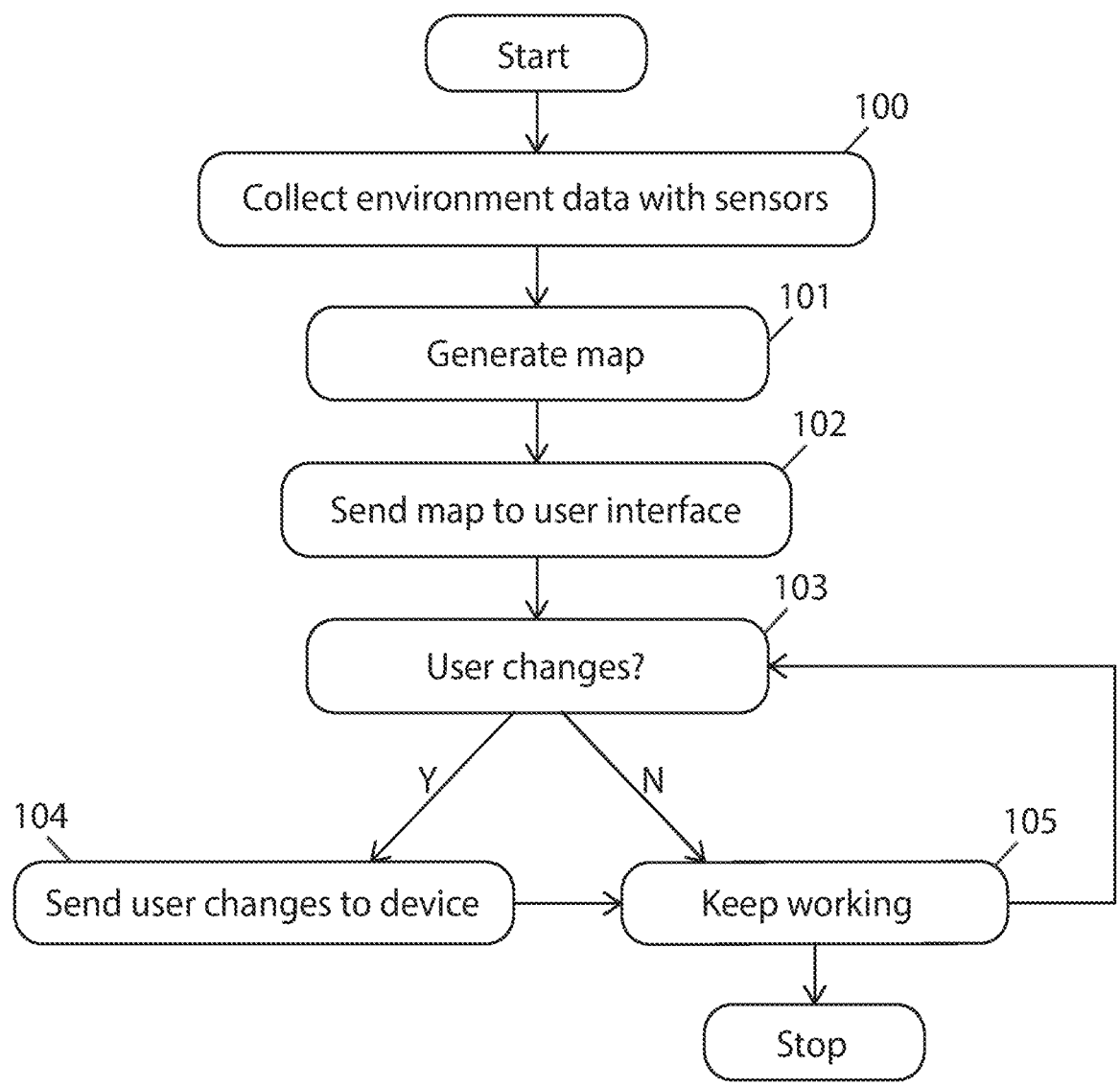
FIG. 1 illustrates a process for generating a map and making changes to the map through a user interface, according to some embodiments.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The term "user interface" as used herein refers to an interface between a human user or operator and one or more devices that enables communication between the user and the device(s). Examples of user interfaces that may be employed in various implementations of the present invention include, but are not limited to, switches, buttons, dials, sliders, a mouse, keyboard, keypad, game controllers, track balls, display screens, various types of graphical user interfaces (GUIs), touch screens, microphones and other types of sensors that may receive some form of human-generated stimulus and generate a signal in response thereto.

Various methods currently exist for generating maps of an environment. Simultaneous localization and mapping (SLAM) techniques, for example, may be used to create a map of a workspace and keep track of a robotic device's location within the workspace.

In some embodiments, once a map is established, it may be sent to a user interface. Maps may be sent to a user interface at any stage; they do not need to be complete. In some embodiments, through the interface, a user may view the map and take any of a variety of actions. In embodiments, a user interface may be provided through a software application on a computer, tablet, smartphone, or a dedicated remote control. In some embodiments, a user may adjust or correct the map boundaries within the user interface by selecting all or part of a boundary line using a cursor, pointer, stylus, mouse, the user's finger, a button or buttons, or other input device on the user interface. In some embodiments, once a boundary line is selected, a user may be provided with various options, such as, but not limited to, deleting, trimming, rotating, elongating, redrawing, moving in a left direction, moving in a right direction, moving in an upward direction, moving in a downward direction, etc. In some embodiments, a user may be given the option to redraw a boundary line using a cursor, pointer, stylus, mouse, the user's finger, a button or buttons, or other input devices.

In some embodiments, maps generated by robotic devices may contain errors, be incomplete, or simply not reflect the areas that a user wishes a robotic floor-cleaning device to service. By adjusting the map, a user may improve the accuracy of the information that the robotic device has about its environment, thereby improving the device's ability to navigate through the environment. A user may, for example, extend the boundaries of a map in areas where the actual boundaries are further than those identified by the system, or trim boundaries where the system identified boundaries further than the actual or desired boundaries. Even in cases where a system creates an accurate map of an environment, a user may prefer to adjust the map boundaries to keep the device from entering some areas.

In some embodiments, data may be sent between the robotic floor-cleaning device and the user interface through one or more network communication connections. Any type of wireless network signals may be used, including, but not limited to, radio signals, Wi-Fi signals, or Bluetooth signals. In some embodiments, map data collected by sensors of the robotic floor-cleaning device is sent to the user interface, where a user may make adjustments and/or apply or adjust settings. In some embodiments, changes made by a user in the user interface are sent to the robotic floor-cleaning device through the one or more network communication connections.

In some embodiments, robotic floor-cleaning devices may have a plurality of tools that can be used concurrently or independently, such as, but not limited to, a suction tool, a mopping tool, and a UV light for killing bacteria. In some embodiments, robotic floor-cleaning devices may also have various settings, such as a deep cleaning setting, a regular cleaning setting, speed settings, movement pattern settings, cleaning frequency settings, etc. In some embodiments, a user is enabled to adjust all of these settings through the user interface. In some embodiments, a user may select with a cursor, pointer, stylus, mouse, the user's finger, a button or buttons, a keyboard, or other input devices any portion of the workspace and select one or more settings to be applied to the area.

FIG. 1 illustrates an example of a process for creating a two-dimensional map and utilizing an interactive user interface. In a first step 100, the system collects data about the environment with sensors positioned on the robotic floor-cleaning device. In a next step 101, the system generates a two-dimensional map of the workspace based on the collected data. As mentioned previously, any available methods may be used to create a two-dimensional map of the environment, including, but not limited to, simultaneous localization and mapping (SLAM) techniques. In some methods, measurement systems, such as LIDAR, are used to measure distances from the robotic device to the nearest obstacle in a 360 degree plane in order to generate a two-dimensional map of the area. In a next step 102, the two-dimensional map is sent to the user interface via one or more network communication connections. In a next step 103, the system checks for changes made by a user on the user interface. If any changes are detected (to either the map boundaries or the operation settings), the method proceeds to step 104 to send the user changes to the device. If no changes to the map boundaries or the operation settings are detected, the method proceeds to step 105 to continue working without any changes.

Figure 2:
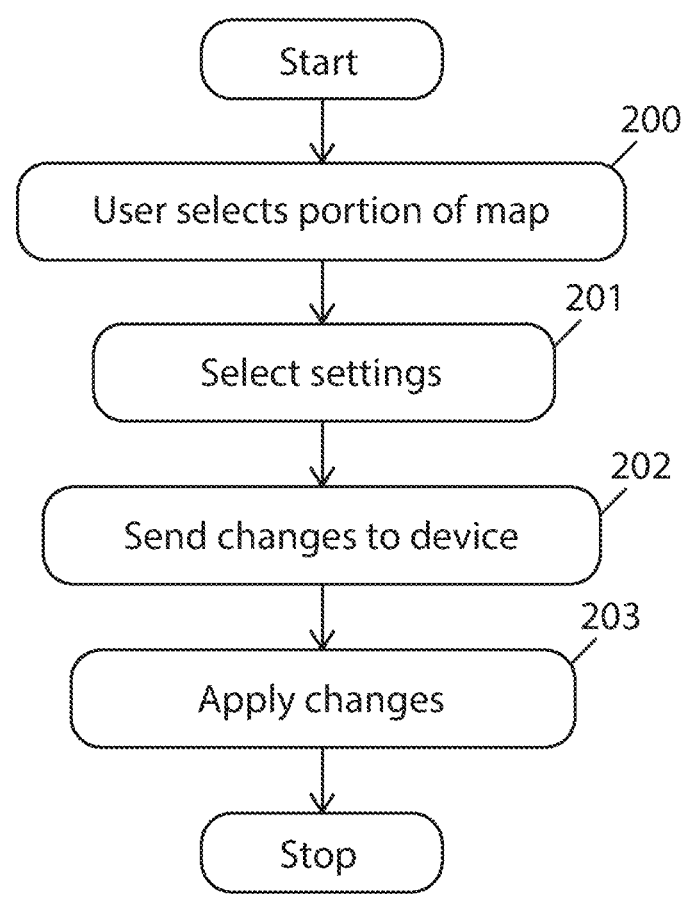
FIG. 2 illustrates a process for selecting settings for a robotic floor-cleaning device through a user interface, according to some embodiments.

FIG. 2 illustrates an example of a process for customizing robotic device operation through a user interface. In a first step 200, a user selects the area of the workspace map in which he or she wants to designate robotic device operation settings. A user may select any size area; the area selected could be comprised of a small portion of the workspace or could encompass the entire workspace.

In a next step 201, a user selects desired settings for the selected area. The particular functions and settings available may be dependent on the capabilities of the particular robotic floor-cleaning device in question. For example, in some embodiments, a user may select any of: cleaning modes, frequency of cleaning, intensity of cleaning, navigation methods, driving speed, etc. In a next step 202, the selections made by the user are sent to the robotic floor-cleaning device. In a next step 203, a processor of the robotic floor-cleaning device processes the received data and applies the user changes.

Figure 3A:
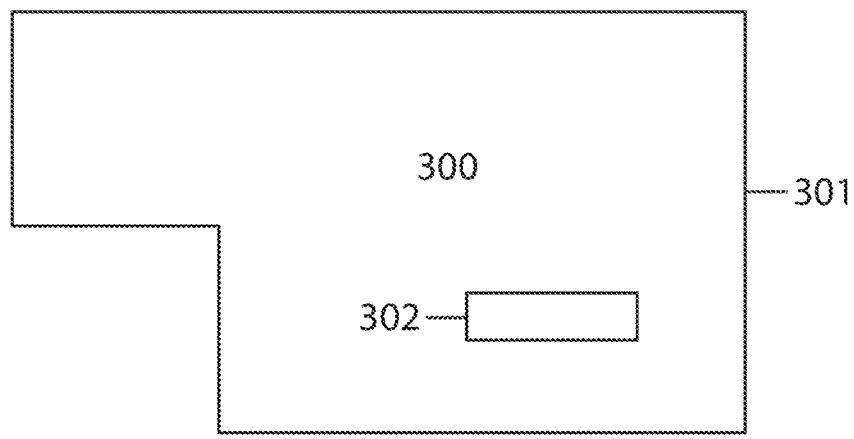
FIG. 3A illustrates an overhead view of actual boundaries of an exemplary workspace.
Figure 3B:
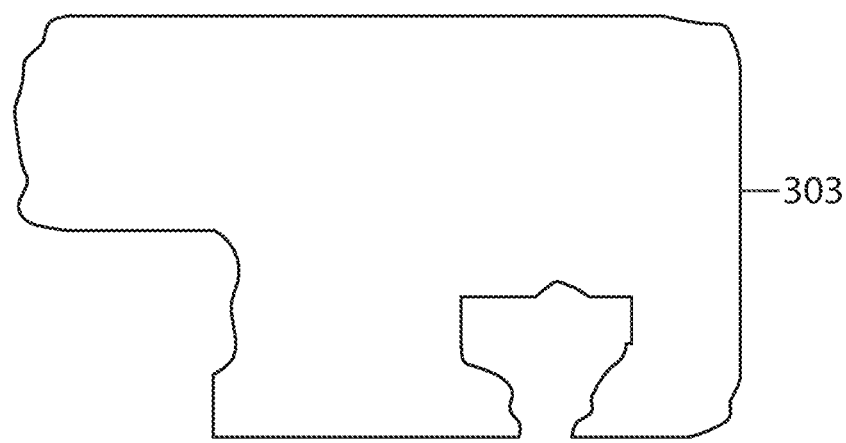
FIG. 3B illustrates an overhead view of a two-dimensional map of the exemplary workspace generated by a robotic floor-cleaning device.
Figure 3C:
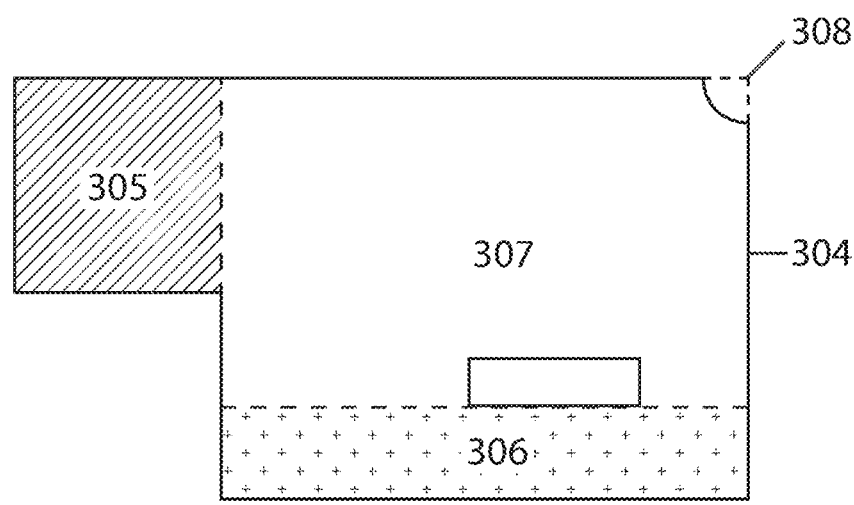
FIG. 3C illustrates an overhead view of a two-dimensional map of the exemplary workspace generated by a robotic floor-cleaning device and adjusted by a user.

FIG. 3A illustrates an overhead view of an exemplary workspace 300. This view shows the actual obstacles that may be detected by a robotic floor-cleaning device. The outer line 301 represents the walls of the workspace and the rectangle 302 represents a piece of furniture. FIG. 3B illustrates an overhead view of a two-dimensional map 303 created by a robotic floor-cleaning device of the workspace 300 shown in FIG. 3A. Because the methods for generating the map are not 100% accurate, the two-dimensional map generated is approximate and not perfect. A robotic floor-cleaning device may devise navigation plans based on the generated map, and thus performance may suffer as a result of imperfections in the generated map. A user may desire to correct the boundary lines to match the actual obstacles. FIG. 3C illustrates an overhead view of a user-adjusted two-dimensional map 304. By changing the boundary lines of the map 303 (shown in FIG. 3B) created by the robotic floor-cleaning device, a user is enabled to create a two-dimensional map of the workspace 300 (shown in FIG. 3A) that accurately identifies obstacles and boundaries in the workspace. Furthermore, as discussed previously, a user may identify areas within the two-dimensional map to be treated in specific ways. By delineating a portion 305 of the map, a user may select settings for that area. For example, a user may identify the area 305 and select weekly cleaning, as opposed to daily or standard cleaning, for that area. In a like manner, a user may define the area 306 and turn on a mopping function for that area. The remaining area 307 may be treated in a default manner. Additionally, in adjusting the boundary lines of the two-dimensional map, a user is permitted to create boundaries anywhere desired, regardless of whether an actual boundary exists in the workspace. In the example shown, the boundary line in the corner 308 has been redrawn to exclude the area near the corner. The robotic floor-cleaning device will thus be prevented from entering the area. This may be useful for keeping a robotic floor-cleaning device out of areas that a user does not want the device to service. For example, a user might exclude areas from a map with fragile objects, pets, cables or wires, etc.

Figure 4:
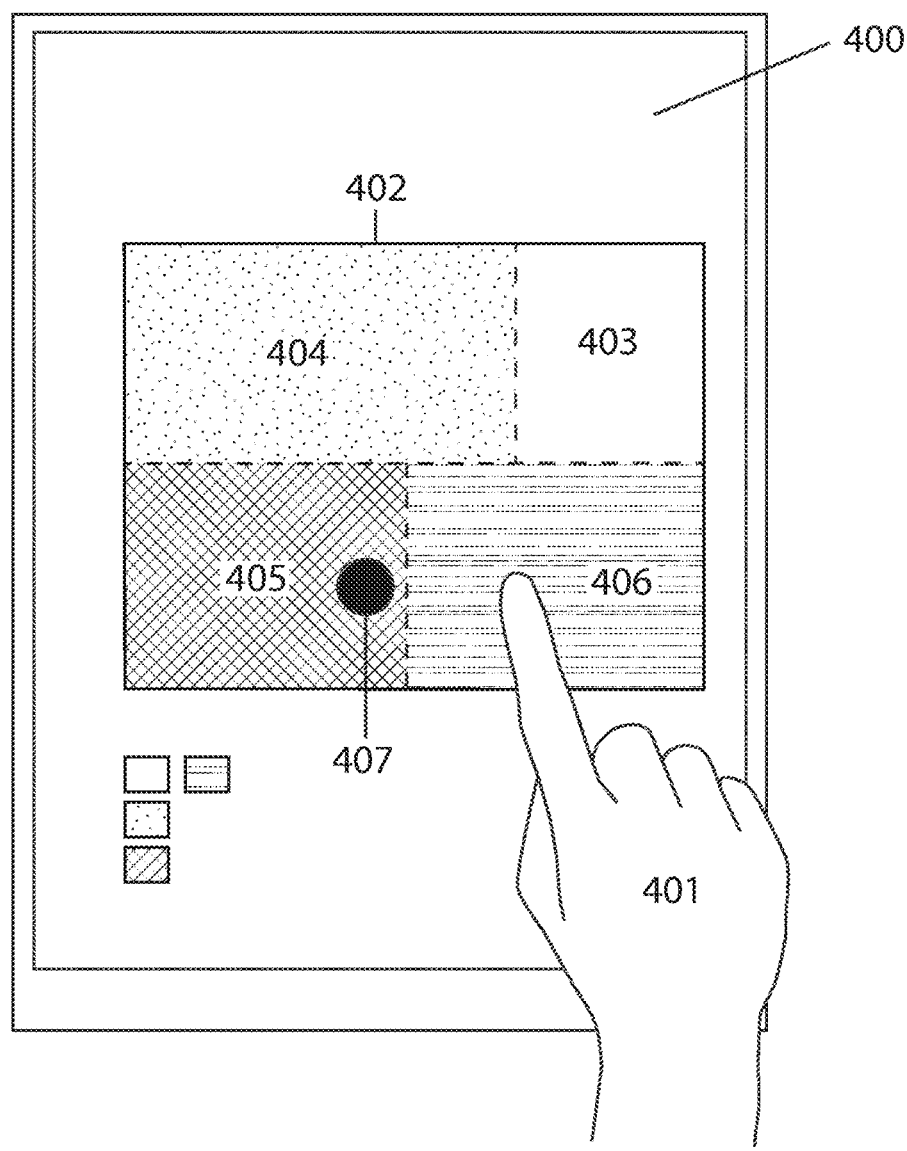
FIG. 4 illustrates an example of a user providing inputs on a user interface to customize a robotic floor-cleaning job.

FIG. 4 illustrates an example of a user interface 400. In the example shown, the user 401 has delineated sections of the workspace 402 to be serviced in different ways by the robotic floor-cleaning device 407. The user has delineated four sections: 403, 404, 405, and 406. The user may select the settings of the robotic floor-cleaning device within each section independently of the other sections using the user interface. In the example shown, a user uses his or her finger to manipulate the map through a touchscreen; however, various other methods may be employed depending on the hardware of the device providing the user interface.

Additionally, in some embodiments, a real-time robotic floor-cleaning device manager may be provided on the user interface to allow a user to instruct the real-time operation of the robotic floor-cleaning device regardless of the device's location within the two-dimensional map. In some embodiments, instructions may include any of turning on or off a mop tool, turning on or off a UV light tool, turning on or off a suction tool, turning on or off an automatic shutoff timer, increasing speed, decreasing speed, driving to a user-identified location, turning in a left or right direction, driving forward, driving backward, stopping movement, commencing one or a series of movement patterns, or any other preprogrammed action.

Figure 5:
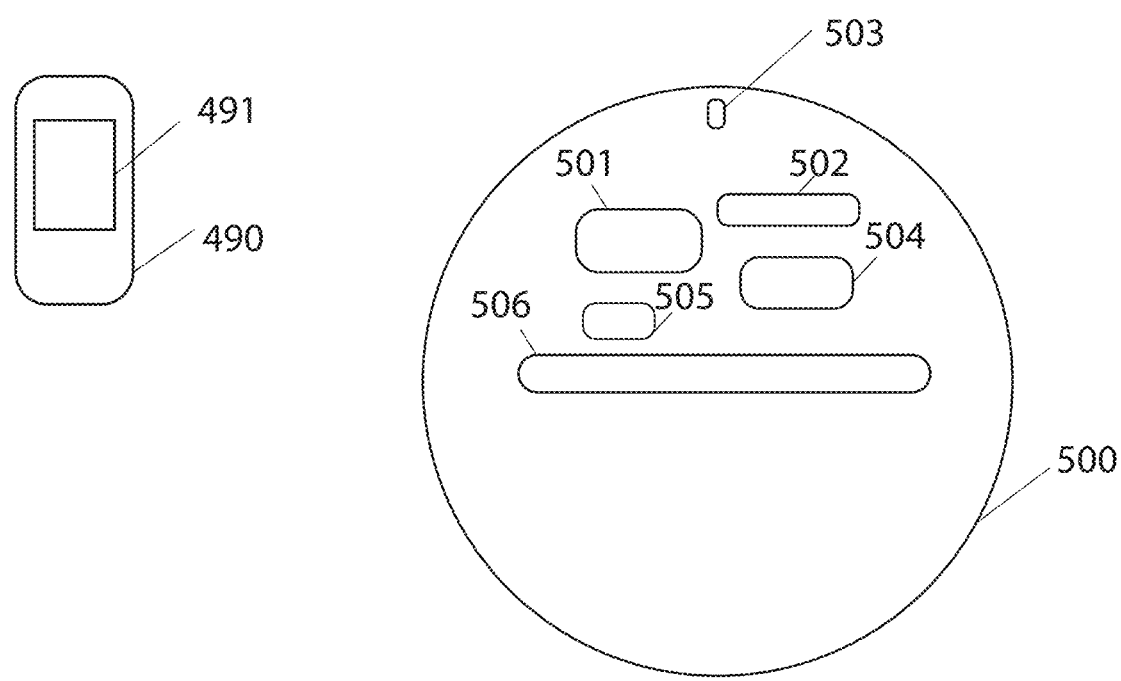
FIG. 5 is a schematic diagram of an example of a robot with which the present techniques may be implemented.

FIG. 5 depicts an example of a robotic device 500 with processor 501, memory 502, sensor 503, actuator 504, timer 505 and cleaning tool 506 (e.g., suction tool, mopping tool, ultraviolet light, etc.). In some embodiments, the robot may include the features of a robot described herein. In some embodiments, program code stored in the memory 502 and executed by the processor 501 may effectuate the operations described herein.

The invention claimed is:

1. A method for operating a robot, comprising:
sensing, with a sensor of the device, data indicative of locations of objects within the environment through which the device moves;
creating, with the robot, a map of an environment while navigating through the environment based on at least some of the sensed data, the map identifying free space and objects within the environment;
cleaning, with a cleaning tool of the robot, floors of the environment;
obtaining, with an application installed on a user computing device wirelessly connected with the robot, via a wireless network, the map including at least a portion of the environment, wherein:
the map includes at least two spatial dimensions; and
the map includes boundaries corresponding to at least one wall within the environment;
presenting, with the application, via a user interface of the application, the map;
receiving, with the application, via the user interface, a specification of a boundary to be added to the map, comprising a user input indicative of a given boundary of the map based on a location on a touchscreen of the user computing device touched by a user;
receiving, with the application, via the user interface, an adjustment to the map based on the specified boundary, comprising a user input indicative of a shift of the given boundary relative to the map in one of four candidate directions comprising of: up, down, left, or right;
sending, from the user computing device, via the wireless network, instructions that cause the robot to obtain a version of the map that incorporates the received adjustment, wherein:
receiving the specification of the boundary comprises creating a boundary to be added to the map; and
the adjustment to the map includes the addition of the specified boundary to the map;
receiving, with the application, via the user interface, a selection of an area;
presenting, with the application, via the user interface, a plurality of robotic operations to be executed comprising at least three of the following:
mopping;
vacuuming;
turning on deep cleaning or high intensity vacuuming;
turning on regular cleaning or medium intensity vacuuming; and
turning on light cleaning or low intensity vacuuming;
receiving, with the application, via the user interface, a selection of the plurality of robotic operations;
after receiving the selections of the plurality of robotic operations, receiving, with the application, via the user interface, a selectable schedule comprising a selection of a day, a time, and a frequency of performance of the selected plurality of robotic operations;
receiving, with the application, via the user interface, a selection of one or more rooms of the environment within which the selected plurality of robotic operations are to be executed according to the selected schedule;
executing, with the robot, the selected plurality of robotic operations according to the selected schedule and the selected one or more rooms; and
navigating the robot in the environment based on the adjustment and the selected plurality of robotic operations executed according to the selected schedule and the selected one or more rooms, causing the robot to clean at least part of the environment with the cleaning tool.

2. The method of claim 1, further comprising one or more of:
driving the robot to a user-identified location;
turning the robot;
driving the robot forward or backward; and
commencing a series of movements of the robot in a pattern.

3. The method of claim 1, wherein:
receiving the specification of the boundary of, or to be added to, the map comprises:
receiving a selection of a part of a line depicting the boundary in the user interface; and
the method further comprises, after receiving the specification of the boundary:

presenting, with the application, via the user interface, user selectable options to adjust the boundary including at least six of the following:
  deleting the boundary;
  rotating the boundary;
  elongating or shortening the boundary;
  moving the boundary left in the map;
  moving the boundary right in the map;
  moving the boundary up in the map; and
  moving the boundary down in the map; and
receiving, with the application, via the user interface, one or more user inputs indicating at least one of the user selectable options.

4. The method of claim 1, further comprising:
applying different cleaning settings to be executed by the robot in different adjacent areas separated by the specified boundary.

5. The method of claim 1, further comprising:
receiving, with the application, via the user interface, one or more user inputs indicating different settings of the robot to apply in different areas of the map;
designating, based on the one or more inputs received, the different areas of the map to have the different settings of the robot applied in the different areas; and
applying the different settings of the robot in the different areas.

6. The method of claim 1, further comprising:
executing, with the application, a loop in which a determination is made in each iteration of the loop as to whether user input relating to a change in the map is received.

7. The method of claim 1, further comprising:
steps for generating the map and making changes to the map through the user interface; and steps for selecting settings for the robot through the user interface.

8. The method of claim 1, further comprising:
receiving, with the application, via the user interface, while the robot is cleaning, a request to change operation of the robot to disable the cleaning tool; and
causing, responsive to the request, the robot to be instructed to disable the cleaning tool.

9. The method of claim 1, wherein receiving the specification of the boundary of the map comprises receiving a selection of a boundary of the map.

10. The method of claim 1, wherein obtaining the map including the at least the portion of the environment comprises:
receiving, with the application, an incomplete map from the robot; and
presenting, with the application, via the user interface, a visual representation of the incomplete map.

11. The method of claim 1, wherein:
the robot comprises a plurality of cleaning tools including instances of cleaning tools selected from among the following:
  a suction tool; and
  a mopping tool.

12. The method of claim 11, further comprising:
receiving, with the application, via the user interface, one or more user inputs indicating different areas of the map to be cleaned with different ones of the cleaning tools; and
applying the different ones of the cleaning tools in the different areas according to the indication.

13. The method of claim 12, wherein:
the robot is configured to apply the plurality of cleaning tools concurrently in at least some areas of the map.

14. The method of claim 1, further comprising:
receiving, with the application, via the user interface, a designation of a first area among a plurality of areas of the map;
receiving, with the application, via the user interface, a first instruction to cause the first area to be cleaned periodically according to a first period;
receiving, with the application, via the user interface, a designation of a second area among the plurality of areas of the map;
receiving, with the application, via the user interface, a second instruction to cause the second area to be cleaned periodically according to a second period, the first area and second area being different areas, and the first period and second period being different periods; and
in response to receiving the first and second instructions, causing the robot to clean the first area periodically according to the first period and to clean the second area periodically according to the second period.

15. The method of claim 1, wherein the first sensor comprises a light imaging, detection, and ranging (LIDAR) sensor configured to measure distances from the robot to objects in order to create the map while the robot is moving through the environment.

16. The method of claim 15, wherein:
the LIDAR sensor is configured to measure distances to obstacles 360 degrees around the robot in a plane.

17. The method of claim 1, wherein:
the robot is configured to update the map based on the received adjustment while mapping the environment with simultaneous localization and mapping.

18. The method of claim 1, wherein:
the robot is configured to create the map before the map is updated to reflect changes in boundaries of the map; and
the robot is configured to clean the environment while creating the map.

19. The method of claim 1, further comprising:
receiving, with the application, via the user interface, a specification of another boundary drawn on a touchscreen of the user computing device, wherein receiving the specification of the other boundary comprises creating another boundary to be added to the map via the user interface; and
after receiving the specification of the other boundary drawn on the touchscreen, sending, from the application, via the wireless network, instructions that cause the robot to obtain a version of the map that incorporates the other boundary.

20. The method of claim 19, further comprising:
receiving, with the application, via the user interface, while the robot is cleaning, a request to drive the robot to a user-designated location; and
causing, responsive to the request, in real-time, the robot to drive to the user-designated location.

21. The method of claim 1, wherein the user computing device comprises a mobile device capable of sending and receiving communications to and from the robot, respectively.

22. The method of claim 21, wherein the communications are sent and received using at least one of: Bluetooth, Radio, and Wi-Fi signals.

23. The method claim 1, wherein receiving the adjustment to the map based on the specified boundary further comprises receiving a user input indicating the given boundary is to be rotated relative to the map in a clockwise or counter-clockwise direction.

24. The method of claim 1, wherein the frequency of performance comprises one or more of: once, weekly, and monthly.

25. The method of claim 1, further comprising:
presenting, with the application, a status of the robot, a battery level of the robot, progress statistics of an activity being executed by the robot.

26. The method of claim 1, further comprising:
receiving, with the application, via the user interface, a selection of one or more areas with carpet.

27. The method of claim 1, further comprising:
receiving, with the application, via the user interface, a selection of one or more areas with high debris accumulation.

28. The method of claim 1, wherein the boundary designates a virtual barrier the robot is configured to avoid crossing when navigating.

29. The method of claim 1, wherein the boundary designates a divider used to segment the environment into two or more areas.

30. A system for robotically cleaning floors, comprising:
a robot configured to clean floors, comprising:
  a cleaning tool;
  a sensor configured to sense data indicative of locations of objects in an environment through which the robot moves, wherein the robot is configured to map, based on sensed data from the sensor, the environment while navigating through the environment with simultaneous localization and mapping to create the map, the map identifying free space and objects of the environment; and
  computer-readable media storing instructions that, when installed and executed, effectuate operations comprising:
    obtaining, with an application installed on a user computing device wirelessly connected with the robot, via a wireless network, the map including at least a portion of the environment, wherein:
      the map includes two spatial dimensions; and
      the map includes boundaries corresponding to at least one wall within the environment; and
    executing, with the robot, a selected plurality of robotic operations according to a selected schedule and a selected one or more rooms; and
    navigating the robot in the environment based on an adjustment to the map and the selected plurality of robotic operations executed according to the selected schedule and the selected one or more rooms, causing the robot to clean at least part of the environment with the cleaning tool;
the application installed on the user computing device configured to:
present, with the application, via a user interface of the application, the map;
receive, with the application, via the user interface, a specification of a boundary to be added to the map, comprising:
  a user input indicative of a given boundary of the map based on a location on the touchscreen of the user computing device touched by the user; and
  receiving, with the application, via the user interface, one or more user inputs indicating at least six of the following:
    deleting the boundary;
    trimming the boundary;
    rotating the boundary;
    elongating the boundary;
    re-drawing the boundary;
    moving the boundary left in the map;
    moving the boundary right in the map;
    moving the boundary up in the map; and
    moving the boundary down in the map;
receive, with the application, via the user interface, the adjustment to the map based on the specified boundary;
send, from the application, via the wireless network, instructions that cause the robot to obtain a version of the map that incorporates the received adjustment, wherein:
  receiving, with the application, via the user interface, the specification of the boundary comprises creating a boundary to be added to the map; and
  the adjustment to the map includes the addition of the specified boundary to the map;
present, with the application, via the user interface, a plurality of robotic operations to be executed comprising at least three of the following:
  mopping;
  vacuuming;
  turning on deep cleaning;
  turning on regular cleaning; and
  turning on light cleaning;
receive, with the application, via the user interface, the selection of the plurality of robotic operations;
after receiving the selection of the plurality of the robotic operations, receive, with the application, via the user interface, the selectable schedule for selecting a day, a time, and a frequency of performance of the selected plurality of robotic operations;
receive, with the application, via the user interface, the selection of one or more rooms of the environment within which the selected plurality of robotic operations are to be executed according to the selected schedule.

* * * * *